No. 744,783. PATENTED NOV. 24, 1903.
W. E. MULHOLLAN.
CAMERA ATTACHMENT.
APPLICATION FILED AUG. 4, 1902.
NO MODEL. 2 SHEETS—SHEET 1.
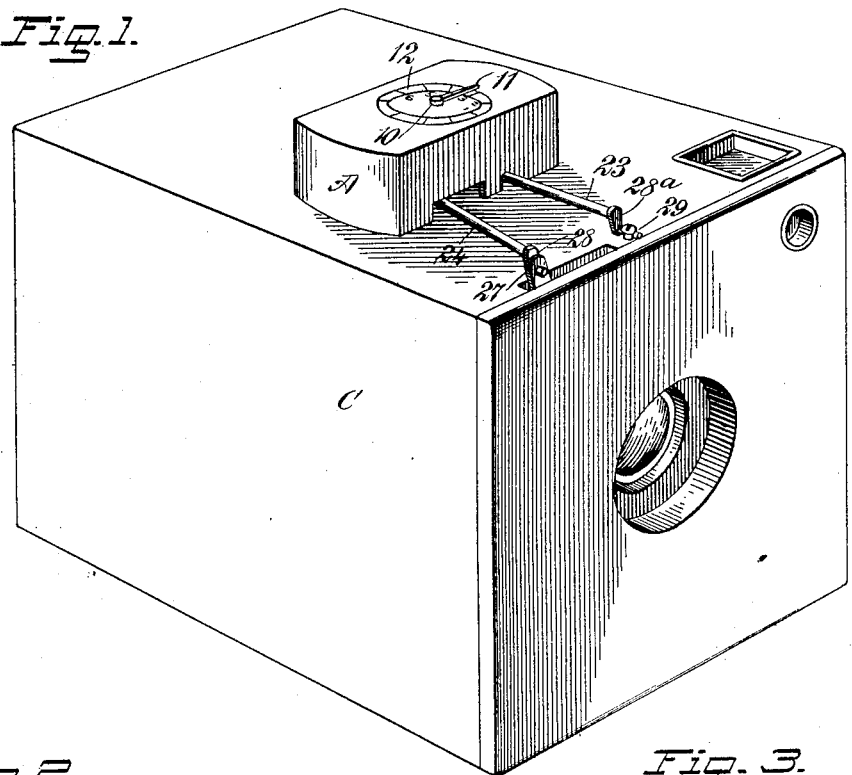
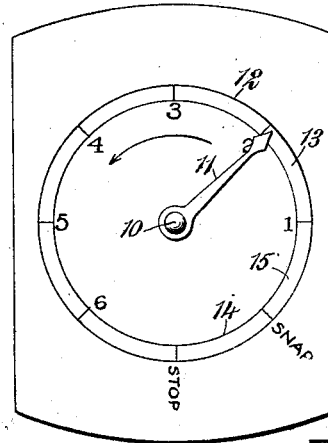
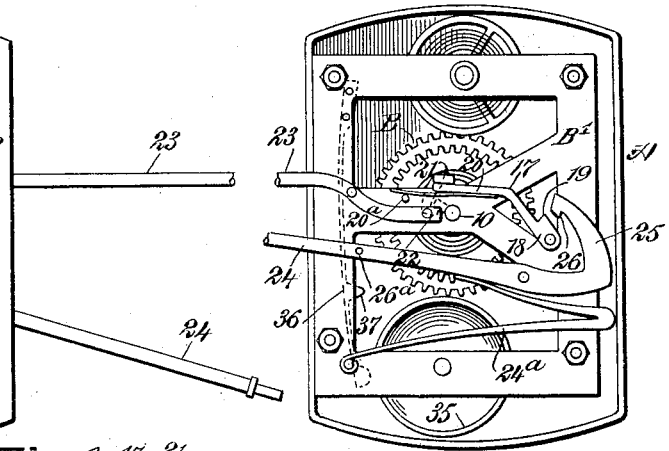
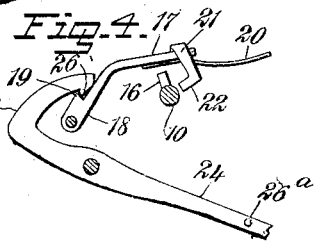
WITNESSES:
James F. Duhamel
J. Fred Acker
INVENTOR
William E. Mulhollan
BY
ATTORNEYS.

No. 744,783. PATENTED NOV. 24, 1903.
W. E. MULHOLLAN.
CAMERA ATTACHMENT.
APPLICATION FILED AUG. 4, 1902.
NO MODEL. 2 SHEETS—SHEET 2.

WITNESSES:
James F. Duhamel.
J. Fedo Acker

INVENTOR
William E. Mulhollan
BY
Munn
ATTORNEYS.

No. 744,783.                                    Patented November 24, 1903.

UNITED STATES PATENT OFFICE.

WILLIAM E. MULHOLLAN, OF JUNEAU, ALASKA TERRITORY.

CAMERA ATTACHMENT.

SPECIFICATION forming part of Letters Patent No. 744,783, dated November 24, 1903.

Application filed August 4, 1902. Serial No. 118,247. (No model.)

*To all whom it may concern:*

Be it known that I, WILLIAM E. MULHOLLAN, a citizen of the United States, and a resident of Juneau, in the Territory of Alaska, have invented a new and Improved Camera Attachment, of which the following is a full, clear, and exact description.

The purpose of my invention is to provide a device which can be removably attached to any camera for the purpose of automatically operating the shutter at a predetermined time, enabling persons to take their own photographs from a point near to or at a distance from the camera.

A further purpose of the invention is to so construct a camera attachment of the character described that it may be adapted to the operating mechanism of any shutter whether the operating medium be a bulb, a push-button, or a lever-arm.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 5:
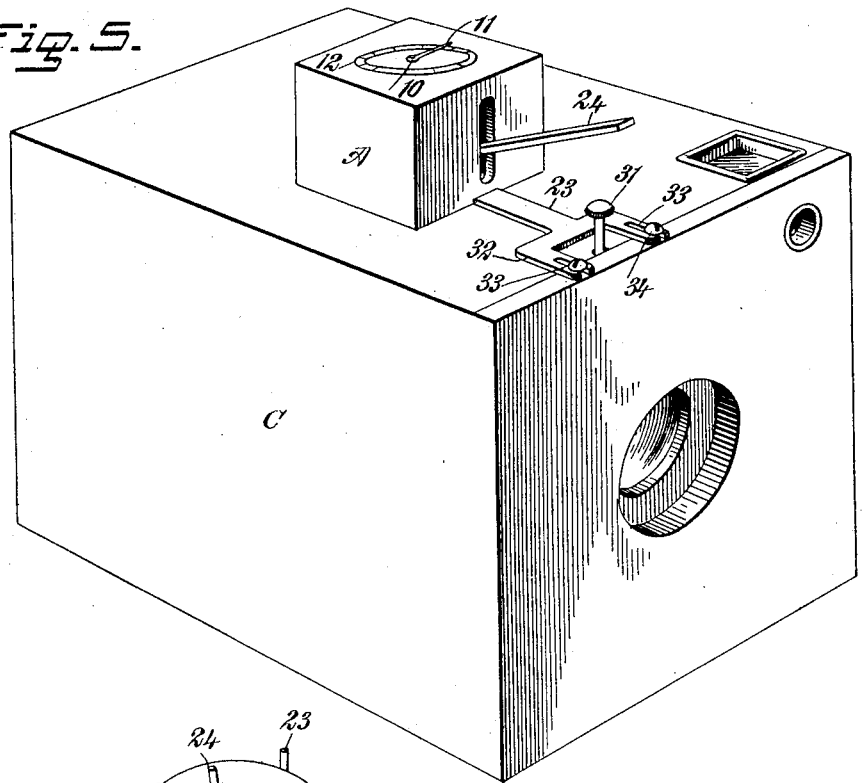
Figure 6:
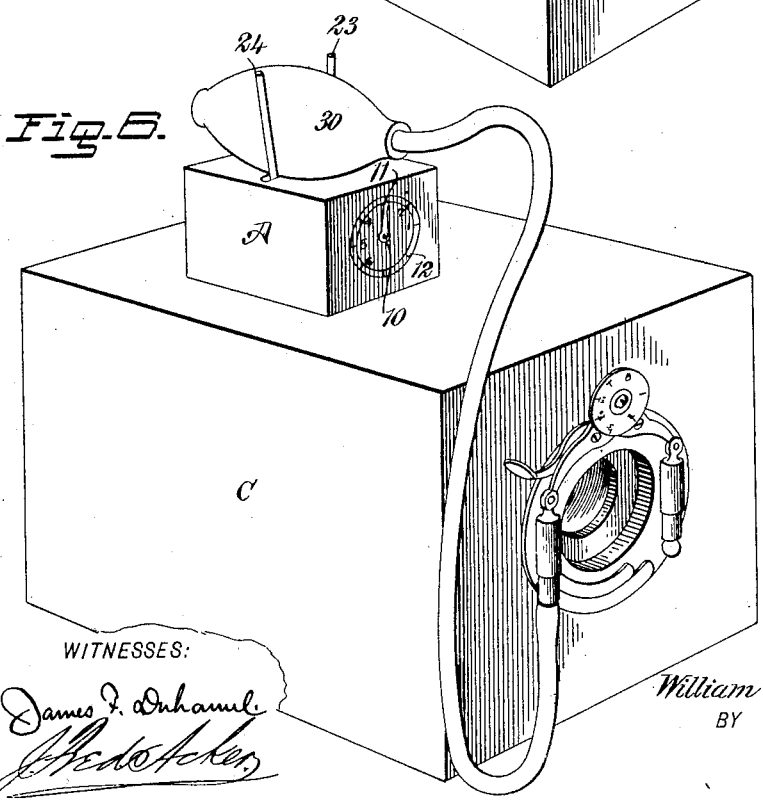

Figure 1 is a perspective view of a camera-box and the attachment applied, the shutter of the box being lever-operated. Fig. 2 is a plan view of the attachment. Fig. 3 is a bottom plan view of the attachment. Fig. 4 is a bottom plan view of certain of the parts of the attachment. Fig. 5 is a perspective view of a camera-box and the attachment, the shutter of the box being operated by a push-button; and Fig. 6 is a perspective view of a camera-box and the attachment, the shutter being operated by a bulb.

The attachment consists of a casing A of suitable size in which a frame B' is secured, carrying clockwork B of any approved type. The winding-post 10 of the said clockwork extends out through the casing, and at the outer end of the post a hand or pointer 11 is secured, adapted to travel over a circular scale 12, having divisions 13 marked to indicate minutes or fractions thereof, a division 15 marked "Stop," which when reached by the pointer indicates that the clockwork has stopped, and a division 15 marked "Snap," which when reached by the pointer indicates that the device has operated to snap the camera-shutter.

Within the frame B' of the clockwork the winding-post 10 is provided with a stud 16 at right angles to said post. A lock-lever 17 is pivoted at its head 18 on the frame B', and its body, which is free, extends at one side of the winding-post 10, as is shown in Fig. 3. The head 18 of the lock-lever at its outer edge where it joins the body is provided with an inclined shoulder 19, and a spring 20 bears at one end against the opposite side of the body of the lever, the opposite end of which spring bears against a pin $20^a$ on the clockwork-frame, and said spring normally holds the head 18 of the lock-lever 17 in receiving position.

At or near the free end of the body of the lock-lever 17 a crank-arm 21 is secured, which extends down and under the lever in direction of the winding-post 10, terminating in a foot 22, adapted at a suitable time to be engaged by the stud 16 of the winding-post to move the head of the lever from receiving position and to release said head from the part with which it may be in locking engagement.

At or near the winding-post 10 the inner end of a fixed arm 23 is secured to the clockwork-frame, and this arm extends out a suitable distance beyond the casing. Opposite the fixed arm 23 the inner end portion of a second arm 24 is pivotally attached to the frame B', adapted for movement to and from the fixed arm, being forced in direction of the fixed arm by a spring $24^a$ of suitable strength. The movable arm 24 extends outward from the casing usually as far as the fixed arm 23, and at its inner end is provided with a hook extension 25, terminating in an inwardly-directed lug 26, which lug is adapted when the body of the arm 24 is forced against the spring $24^a$ away from the fixed arm 23 to have locking engagement with the shoulder 19 on the lock-lever 17. Said movable arm 24 is provided with a pin $26^a$, extending from its inner face and located between the pivot of the arm and its outer end.

The casing A is attached to the camera-box C in any suitable or approved manner, preferably so that the casing can be removed at will, and when the shutter of the box C is operated through the medium of a lever 27, as is shown in Fig. 1, the outer end of the movable arm 24 is pivotally attached to the projecting end of the shutter-lever 27, usually through the medium of a crank-arm 28, while a similar crank-arm 28ª is attached to the outer end of the fixed arm 23 and is attached to the camera-box by a screw 29 or its equivalent, and this arrangement is practically all that is needed to hold the attachment in position on the box.

When the arm 24 has been set and the proper time arrives to release the arm, the spring 24ª will act to force the arm 24 in direction of the arm 23, and thus move the shutter-lever 27 in a direction to manipulate the shutter for exposure.

When the attachment is made to a camera-box having its shutter operated by a push-button 31, as is shown in Fig. 5, the attachment is so placed that the fixed arm 23 will be on the camera-box, while the movable arm 24 will be above the fixed arm and, as described, movable to and from the fixed arm. Preferably under this arrangement of the attachment it is secured to the camera-box by forming a U-shaped projection 32 at the outer end of the fixed arm 23, the members of which projection extend one at each side of the push-button 31 and are provided with slots 33, which receive screws 34, entered into the camera-box. Under this arrangement when the movable arm 24 has been set and has been released at the proper time it will be carried down upon the push-button 31 and will operate the same to operate the shutter for exposure.

When the shutter of the camera-box C is operated by a bulb 30, as is shown in Fig. 6, the device is so placed on the camera-box that the arms 23 and 24 will extend in an upward direction, and after the movable arm 24 has been placed in locking position the bulb 30 is fitted in between the two arms 23 and 24, and when the proper time arrives to release the movable arm 24 said arm in its movement toward the fixed arm 23 will compress the bulb 30, and thus operate the shutter.

When the exposure has been made, an alarm is sounded. This is accomplished by placing a gong 35 in the clockwork-frame B', as is shown in Fig. 3, and providing a spring-hammer having an extension 37, which is engaged by the pin 26ª of the movable arm 24, when the said arm is set and has passed by the said pin, so that when the arm 24 is forced inward by its spring 24ª in its return passage by the projection 37 of the alarm-hammer it will force the said hammer outward and cause the said hammer on its return to strike the gong 35 with sufficient force to sound an alarm.

In the operation of this device the pointer 11 is moved from "Stop" to any desired number on the scale—4, for example, which would represent four minutes of time—and in thus moving the pointer 11 the winding-post is turned sufficiently to wind the main spring to set the clockwork in operation, and the stud 16 on the winding-post is removed from the foot 22 of the angular arm on the lock-lever 17, enabling the movable arm 24 to be carried away from the fixed arm 23, bringing the spur 26 at the hook end of the movable arm in locking engagement with the shoulder 19 on the lock-lever 17. The attachment is now set properly on the camera-box, and if the clockwork does not start of itself the device is shaken gently to start the same. The operator may now take a desired position near to or at a distance from the camera, and when the four minutes of time have elapsed the pointer 11 will have reached the word "Snap" and the stud 16 on the winding-post 10 will have been brought in engagement with the foot 22 of the lock-lever 17, forcing the said lever against the tension of its spring 20 and carrying the head 18 of the lever out of engagement with the hook-section 25 of the movable arm 24, permitting the spring 24ª of the said arm to act and force the arm 24 in direction of the fixed arm 23 to operate the shutter in either manner that has been described, and on the return movement of the said arm 24 an alarm is sounded, notifying the party that the picture has been taken. The clockwork will continue to run until the pointer reaches the word "Stop" on the scale or dial 12.

Having thus described my invention, I claim as new and desire to secure by Letters Patent—

1. A time attachment for cameras, adapted to automatically operate the shutter, consisting of a clockwork, a fixed arm, a spring-pressed arm movable to and from the fixed arm and adapted to operate the operating member of the shutter mechanism when moved toward said fixed arm, a locking device adapted to be manually set relative to the movable arm, and means controlled by the clockwork for automatically carrying the locking device from locking position to permit the movable arm to be moved by its spring toward the fixed arm, as described.

2. A time camera attachment for controlling the movement of a camera-shutter, comprising a clockwork, a fixed arm, a spring-pressed arm movable to and from the fixed arm and adapted to operate the operating member of the shutter mechanism when moved toward the fixed arm, a locking device for the movable arm, whereby to hold it at an angle to the fixed arm, means operated by the clockwork for releasing the locking device to permit the movable arm to be moved by its spring toward the fixed arm to operate the operating member of the shutter mechanism, and an alarm operated by the said movable arm, substantially as described.

3. A camera attachment, consisting of a casing, a clockwork within the casing, a pointer connected with the winding-post of the clockwork, a fixed arm, a spring-pressed and pivoted arm adapted for movement to and from the fixed arm and adapted to operate the operating member of the shutter mechanism when moved toward the fixed arm, a lock-lever for the pivoted arm, and a trip for the lock-lever carried by the winding-post of the clockwork for releasing the locking-lever to permit the pivoted arm to be moved by its spring toward the fixed arm, substantially as described.

4. A time camera attachment for controlling the movement of a camera-shutter, consisting of a clockwork adapted for detachable connection to a camera-box, a fixed arm, means for attaching the said fixed arm to a camera-box, a second arm movable to and from the fixed arm, which latter arm is adapted when moved toward the fixed arm to operate the operating member of the camera-shutter, a locking device for the movable arm, and a trip for the locking device, operated by the clockwork, substantially as described.

5. A time attachment for controlling the movement of a camera-shutter, consisting of a clockwork, a trip-stud on the winding-post of the clockwork, a pointer attached to the winding-post, a scale in minutes over which the pointer travels, a fixed arm, a spring-pressed and pivoted arm having movement to and from the fixed arm and adapted to operate the operating member of the shutter mechanism when moved by its spring toward the fixed arm, and a locking device for the pivoted arm released from locking engagement by the action of the said stud, as described.

6. A time attachment for controlling the movement of a camera-shutter, consisting of a clockwork, a trip-stud on the winding-post of the clockwork, a pointer attached to the winding-post, a scale in minutes over which the pointer travels, a fixed arm, a spring-pressed and pivoted arm having movement to and from the fixed arm and adapted to operate the operating member of the shutter mechanism when moved by its spring toward the fixed arm, a locking device for the pivoted arm, released from locking engagement by the action of the said stud, a gong, a hammer for the gong, and means substantially as described for operating the said hammer on the return movement of the pivoted arm, as described.

7. A camera attachment, comprising a casing adapted to be secured to a camera and provided with a dial, a clockwork in the casing, a pointer carried by the clockwork and adapted to travel over the dial, a pivoted and spring-pressed arm projecting from the casing, a locking-lever engaging the said pivoted arm to hold it against the action of its spring in inoperative position, and means for operating the locking-lever from the clockwork to release the pivoted arm to permit it to be moved by its spring to operate the operating member of the shutter mechanism, as set forth.

8. A camera attachment, comprising a casing adapted to be secured to a camera and carrying a dial, a clockwork in the casing, a pointer carried by an arbor of the clockwork and adapted to travel over the dial, a pivoted and spring-pressed arm for operating the trip of the shutter mechanism, a pivoted and spring-pressed locking-lever for engaging the said pivoted arm to hold it in inoperative position, and a trip carried by the arbor of the clockwork carrying the pointer for operating locking-lever to release the pivoted arm and thereby permit it to operate the shutter mechanism, as set forth.

9. In a camera attachment, the combination with a casing, and a clockwork therein, of a pivoted and spring-pressed arm projecting from the casing and adapted to engage the trip of the shutter mechanism to operate the same, a pivoted and spring-pressed locking-lever for engaging the said arm to hold it in inoperative position, said lever being provided with a projection at one end, and a stud on the arbor of the clockwork for engaging the projection of the said lever to operate it and thereby release the arm to permit it to operate the shutter mechanism, as set forth.

10. The combination with a camera, and the operating member of the shutter mechanism, of a casing on the camera and carrying a dial, a clockwork in the casing, a pointer on an arbor of the clockwork and traveling over the dial, a pivoted and spring-pressed arm having one end for engagement with the operating member of the shutter mechanism to operate the same, a locking device for locking the arm against the action of the spring in inactive position, and means for operating the locking device from the clockwork to release the said arm to permit it to be operated by its spring, as and for the purpose set forth.

11. The combination with a camera, and the operating member of the shutter mechanism thereof, of a casing secured to the camera, and carrying a dial, a clockwork in the casing and provided with a pointer traveling over the dial, a pivoted and spring-pressed arm for engagement with the operating member of the shutter mechanism, a locking device for locking the said arm in inactive position, means for releasing the locking device from the clockwork, a gong, and a hammer for the gong, operated by the said pivoted arm, as set forth.

12. The combination with a camera, and the operating member of the shutter mechanism thereof, of a clockwork, a pivoted and spring-pressed arm for engaging the operating member of the shutter mechanism to operate the same, means for locking the arm against the action of its spring in inactive position, means controlled by the clockwork for releasing the said arm to permit it to be operated by its spring, a gong, a striker, and means for operating the striker from the said pivoted arm, as set forth.

13. The combination with a camera, and the operating member of the shutter mechanism thereof, of a case secured upon the camera and provided with a fixed arm projecting therefrom, a clockwork in the case, a pivoted and spring-pressed arm mounted in the case and having its end projecting outwardly therefrom, said arm being movable toward and from the fixed arm, and adapted to engage the operating member of the shutter mechanism, means for locking the movable arm in inactive position, and means controlled by the clockwork for releasing the said arm, as set forth.

14. A camera attachment, comprising a casing adapted to be secured upon a camera, a clockwork in the casing, a fixed arm projecting from the casing, a pivoted and spring-pressed arm mounted in the casing and projecting out beyond the same, said pivoted arm being movable toward and from the fixed arm and adapted to engage the operating member of the shutter mechanism, a locking lever for locking the said pivoted arm in inactive position, and means for operating the locking lever from the clockwork to release the said pivoted arm, as set forth.

15. A camera attachment, comprising a casing carrying a dial and adapted to be secured upon a camera, a clockwork in the casing, a pointer carried by the clockwork to travel over the dial, a fixed arm projecting from the casing, a pivoted and spring-pressed arm mounted in the casing and projecting out beyond the same, said pivoted arm being movable toward and from the fixed arm and adapted to engage the operating member of the shutter mechanism to operate the same, a locking-lever for the pivoted arm, means for releasing the locking-lever, said means being controlled by the clockwork, an alarm, and means controlled by the pivoted arm for sounding an alarm, as set forth.

In testimony whereof I have signed my name to this specification in the presence of two subscribing witnesses.

WILLIAM E. MULHOLLAN.

Witnesses:
J. J. CLARKE,
L. C. ABRAMS.